Aug. 25, 1925.

A. W. MACHLET

GAS FURNACE

Filed Aug. 6, 1923

1,550,911

Inventor:
Adolph W Machlet
by D.C. Stickney
Attorney

Patented Aug. 25, 1925.

1,550,911

UNITED STATES PATENT OFFICE.

ADOLPH W. MACHLET, OF ELIZABETH, NEW JERSEY.

GAS FURNACE.

Application filed August 6, 1923. Serial No. 656,106.

*To all whom it may concern:*

Be it known that I, ADOLPH W. MACHLET, a citizen of the United States, residing in Elizabeth, in the county of Union and State of New Jersey, have invented certain new and useful Improvements in Gas Furnaces, of which the following is a specification.

This invention relates to heating iron, steel and other metals to high heats for purposes of forging, welding, hardening, etc.

In gas furnaces the heating of the work-pieces is usually effected by a mixture of gas and air, or oil and air, which enters the furnace through burners, the burners being often arranged at the upper part of the furnace, and the flames heating the work evenly; the furnace usually having a lining of refractory material and being usually closed (except for a small vent) during the heating operation, so as to confine the flames upon the work and minimize the waste of heat.

The proportions of gas and air in the mixture are usually controlled by valves; the air being usually supplied under pressure, and the mixture being delivered from the burners into the furnace under pressure. When the mixture is first ignited, the furnace fills with flame, whereupon the furnace is closed, and there is no escape for the products of combustion except through a vent. No atmospheric air can enter through the vent. The air for supplying the combustion enters the furnace only through the burners, as it is part of the mixture that is supplied by said burners.

Fine regulating means are usually employed for regulating the proportions of air and gas in the mixture, and the most economical and best results are secured by thinning the gas mixture with air until a mixture is secured which yields a maximum of heat.

When such a mixture is employed, it is found that a scale is apt to form upon the work-pieces, which are frequently heated to a white heat in the furnace.

This scale is objectionable when the work-pieces are to be welded, inasmuch as the scale covers the welding surface, and hence prevents the formation of a perfect weld. The scale is also objectionable when the heated work-pieces are to be forged, because the scale separates from the metal in the forging dies, and is a source of annoyance, trouble and expense, and results in an inferior product. The formation of the scale is also objectionable in other classes of work.

An object of the invention is to minimize or avoid the forming of a scale on work-pieces that are heated in the furnace in the manner described.

It has long been desired to find a way to remove this scale, which investigation has shown is due to a combination of oxygen with iron or other metal, the oxygen entering the furnace as a part of the air which forms a portion of the combustible mixture.

Instead of following the usual methods of dealing with scale, by removing it after its formation and therefore after a certain portion of the iron has been burnt up, I have conceived that it would be possible to prevent the original formation of the scale. To this end I have traced the trouble to the fact that oxygen enters the furnace and attacks the iron or metal as soon as it becomes hot enough to burn. I have further discovered that there enters the furnace in the combustible mixture a surplus of oxygen, that is, more oxygen than is used up in consuming the fuel gas which forms part of the mixture, and that it is this surplus oxygen which burns the metal or forms the scale thereon. This surplus of oxygen cannot be avoided, inasmuch as unless the air and gas are admitted in the usual proportions, the required degree of heat cannot be attained.

It has been an object to discover if the formation of scale could be prevented, even though the unavoidable surplus of oxygen passed through the burners into the furnace. In attaining this end, I have devised means for avoiding the attack upon the metal by the surplus oxygen. This is done by the separate introduction into the furnace of combustible means which will unite with said surplus oxygen more readily than will the metal. This means consists preferably of a fuel gas which is separately admitted to the furnace in raw condition, that is, unmixed with air. A proportion of five percent or more of fuel gas, admitted through a separate orifice into the furnace (which is filled with flames arising from combustion of the mixture supplied by the regular burners), will suffice to take up the surplus oxygen from the regular burners and combine therewith, thereby neutralizing or preventing said surplus oxygen from uniting with the iron, or from burning the same, and no scale is formed. This neutralizing gas for the surplus oxygen, although it constitutes an over-supply of fuel, does not diminish the heat of the furnace, because it may be admitted through a separate orifice or burner, and preferably under lower pressure than the mixture of fuel-gas and air. The auxiliary orifice or burner may in some cases be arranged at a lower level than the main burners, and may, if desired, enter through the back of the furnace at a point remote from the gate or other vent, so that atmospheric air cannot enter the furnace and combine with said neutralizing gas, so that the latter can only burn by combining with the surplus of oxygen that has already been introduced into the furnace, whereby said surplus of oxygen is precluded from attacking the hot iron.

Usually a system of piping is provided for supplying the furnace burners with gas and air under pressure, and usually the gas and air are mixed at a point outside of the furnace, and the mixture supplied directly to the burners. The supply of auxiliary or neutralizing fuel gas may be taken directly from the gas-supply main, through a regulating valve.

I find that the proportion of about five percent of raw fuel gas to ninety-five percent of the usual mixture suffices for combination with all of the surplus oxygen, so that the articles are heated by flames from which all of the oxygen has been extracted in this manner, and remain clean and substantially without scale; they make an excellent weld and are also excellent for forging and other purposes.

Another object of the invention is to improve the process of heating steel, preparatory to hardening the same. In certain grades of steel, especially high-speed steel, very high heat is required for the hardening operation. On the other hand, this steel has a low percentage of carbon. The difficulty is therefore presented that the low-carbon steel must be made very hot by flames produced by the combustion of mixed fuel and air, with its unavoidable surplus of oxygen; while steel having such a small proportion should not be robbed of any carbon. This difficulty is overcome by the introduction of oil, raw gas or other raw fuel, as herein disclosed, and the high-speed steel and other steels low in carbon may be successfully heated with the loss of but little, if any, carbon therefrom. Substantial loss of carbon from the low-carbon steel is precluded because the excess of oxygen combines so readily with the carbon in the raw fuel gas, i. e., the gas which is commonly used for fuel, and which commonly has a large content or proportion of carbon therein. All or nearly all of the excess oxygen thus combining with the carbon content of the small excess of fuel gas which is introduced into the furnace separately and in raw (unmixed with air or oxygen) condition, there remains little or no surplus oxygen in the furnace, so that the low-carbon steel is robbed but little, if at all, of its carbon; and so that scale formation on various steels is minimized or prevented.

Other methods of mixing air with gas and other forms of fuel may be used, and other auxiliary methods of supplying the slight excess of raw fuel for the purpose stated.

Other features and advantages will hereinafter appear.

In the accompanying drawings.

Figure 1:
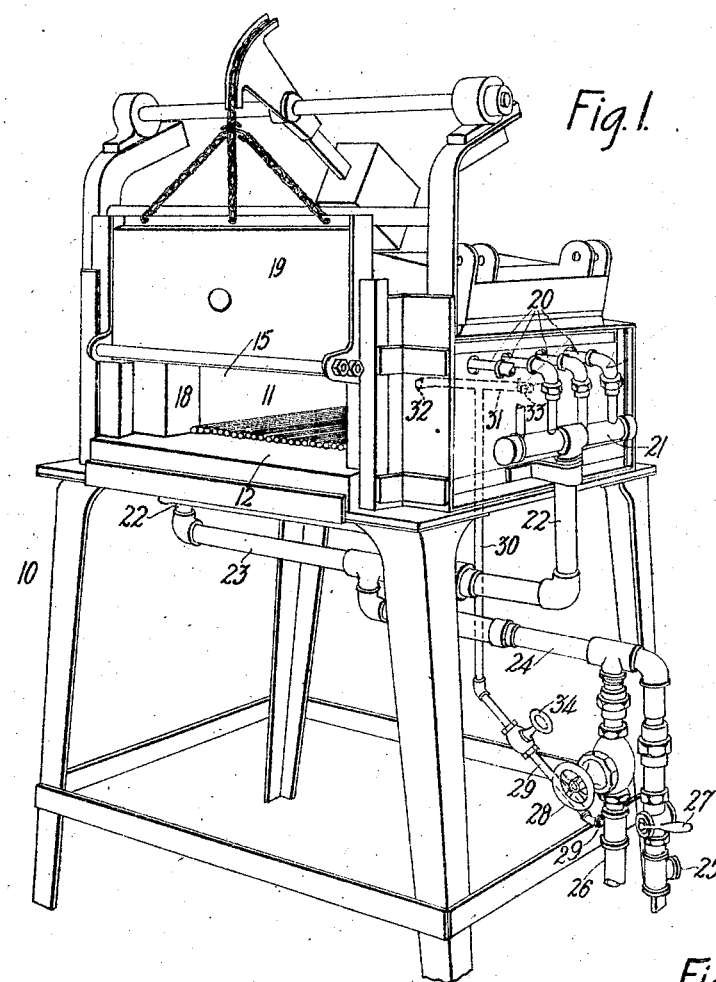
Figure 1 is a perspective of a furnace to illustrate the present improvements in one way; the furnace being shown open, with work rods lying upon the floor thereof.
Figure 2:
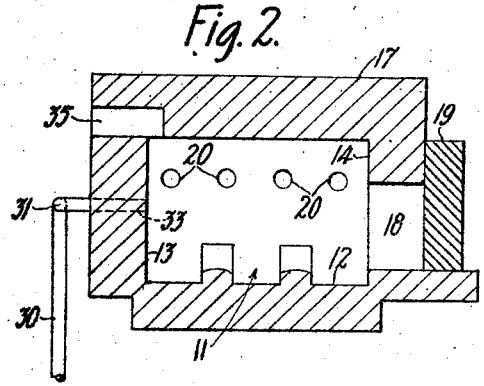
Figure 2 is a sectional elevation from front to rear to illustrate the flame chamber of the furnace; the gate being closed.
Figure 3:
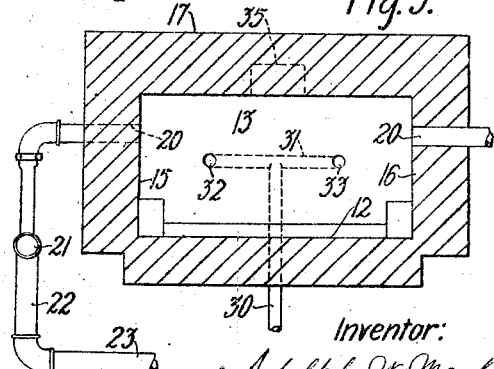
Figure 3 is a sectional elevation taken from right to left of the flame chamber.

The invention may be used with various kinds of furnaces. one form of which is shown at 10, Figure 1, comprising a flame chamber 11, which usually has a floor 12, a rear wall 13, a front wall 14, side walls 15, 16, and a top 17; the front wall usually having an opening 18 closed by a gate 19.

The heating mixture of gas and air under pressure is admitted to the furnace through burners 20, usually entering through the upper portions of the side walls 15, 16 of the flame chamber, these burners leading from manifolds 21, which are supplied by pipes 22, having a connection 23, to which leads a supply pipe 24, the latter connected to a compressed air main 25 and to a gas main 26. The pressure of compressed air may be controlled by a valve 27, and the supply of fuel may be controlled by a valve 28. As so far described, the elements are of ordinary construction.

From the gas main 26 leads an auxiliary pipe 29, which may extend upwardly at 30 in rear of the furnace, and may have at its upper end a branch 31 terminating in inlets 32, 33, said inlets or jets extending through the rear wall 13 of the furnace, at points preferably below the level of the heating burners 20. The control of the flow of gas through the jets 32, 33 may be effected by a valve 34 in the auxiliary pipe 29 or otherwise.

The work having been placed in the furnace, the compressed air and gas mixture is turned on and ignited at the burners 20, when the gate 19 is closed, there is no escape for the products of combustion except through a vent 35, through which therefore no air can enter the furnace. The valve 34 is opened, to admit the neutralizing raw gas, oil, or other raw fuel, which ignites. The raw gas or fuel entering through the jets 32, 33, being five percent or more of the mixture entering through the compressed air and gas feed pipe 24, suffices to combine with the surplus of oxygen that enters through said pipe 24, so that the work is not burned, and the formation of scale thereon is prevented, even though the work is heated sufficiently for forging, welding and analogous purposes.

Variations may be resorted to within the scope of the invention, and portions of the improvements may be used without others.

Having thus described my invention, I claim:

1. A furnace for heating iron, steel and other metal articles to high heat, for forging, welding, hardening and other purposes, comprising a flame chamber provided with burners, means for supplying a mixture of air and carbonous gas to the burners to secure the required degree of heat, whereby an excess of oxygen is admitted to the flame chamber of the furnace, and independent means connected to a fuel gas main for supplying separately to said furnace a small excess of carbon as raw gas or raw fuel directly to said flame chamber, neutralizing said excess of oxygen and precluding the same from burning the metal articles or forming scale thereon.

2. A furnace provided with regulatable burners for a mixture of compressed air and fuel gas, and with a separate direct inlet jet for raw gas, to neutralize the excess of oxygen that enters through the burners, said jet sufficiently separated from said burners to avoid altering the proportions of gas and air burning mixture supplied through said burners.

3. The combination with a furnace and means, including burners, for supplying a mixture of compressed air and fuel gas thereto, of regulating means for varying the proportions of the mixture of compressed air and fuel gas, and separate means connected to a fuel gas main and directly admitting a small proportion of raw fuel gas independently of the burners.

4. The combination with a furnace and means, including burners, for supplying a mixture of compressed air and fuel gas thereto, of regulating means for varying the proportions of the mixture of compressed air and fuel gas, separate means for directly admitting, at a distance from the deliveries from said burners, a small proportion of raw fuel gas independently of the burners, and means for regulating the supply of raw fuel gas.

5. A furnace having burners for compressed air and fuel gas, and also having jets remote from said burners and connected to a fuel gas main and supplying a small proportion of oxygen-neutralizing raw fuel gas for the purpose specified.

ADOLPH W. MACHLET.